United States Patent [19]

Janus

[11] Patent Number: 4,811,772
[45] Date of Patent: Mar. 14, 1989

[54] PNEUMATIC TIRE HAVING MULTI-PART ANNULAR BEAD CORE

[76] Inventor: Jonny Janus, Kreuzstrasse 53, D-4000 Düsseldorf 1, Fed. Rep. of Germany

[21] Appl. No.: 82,124
[22] PCT Filed: Nov. 5, 1985
[86] PCT No.: PCT/DE85/00437
§ 371 Date: Jul. 2, 1987
§ 102(e) Date: Jul. 2, 1987
[87] PCT Pub. No.: WO87/02627
PCT Pub. Date: May 7, 1987

[51] Int. Cl.$^4$ ............................................. B60C 15/04
[52] U.S. Cl. ..................................................... 152/540
[58] Field of Search ............... 152/539, 540, 544, 545, 152/548, 550, 551, 552, 554; 245/1.5

[56] References Cited

U.S. PATENT DOCUMENTS

| | | | |
|---|---|---|---|
| 1,009,192 | 11/1911 | Sloper | 152/539 |
| 1,234,142 | 7/1917 | Dickinson | 152/539 |
| 1,234,143 | 7/1917 | Dickinson | 152/539 |
| 1,492,256 | 4/1924 | Maranville | |
| 1,527,700 | 2/1925 | Pennington | 245/1.5 |

FOREIGN PATENT DOCUMENTS

| | | |
|---|---|---|
| 2408474 | 8/1975 | Fed. Rep. of Germany . |
| 468733 | 7/1914 | France . |
| 698304 | 1/1931 | France . |
| 1327810 | 4/1963 | France . |
| 2299169 | 8/1976 | France . |
| 2123360 | 2/1984 | United Kingdom . |
| 2135253 | 4/1984 | United Kingdom . |

*Primary Examiner*—Michael W. Ball
*Assistant Examiner*—Geoffrey L. Knable
*Attorney, Agent, or Firm*—Pearne, Gordon, McCoy & Granger

[57] ABSTRACT

A pneumatic tire having beads disposed about an inner diameter of the tire for mounting to the flanges of a wheel of a vehicle is disclosed. Each of the beads includes a multi-part annular core comprising rings having an L-shape or U-shape cross-section including substantially flat limbs. The rings are mechanically interlocked to provide the core with portions of the limbs disposed in adjacent relationship for receiving therebetween ends of the tire carcass plies and securing them to the cores.

10 Claims, 1 Drawing Sheet

U.S. Patent  Mar. 14, 1989  4,811,772
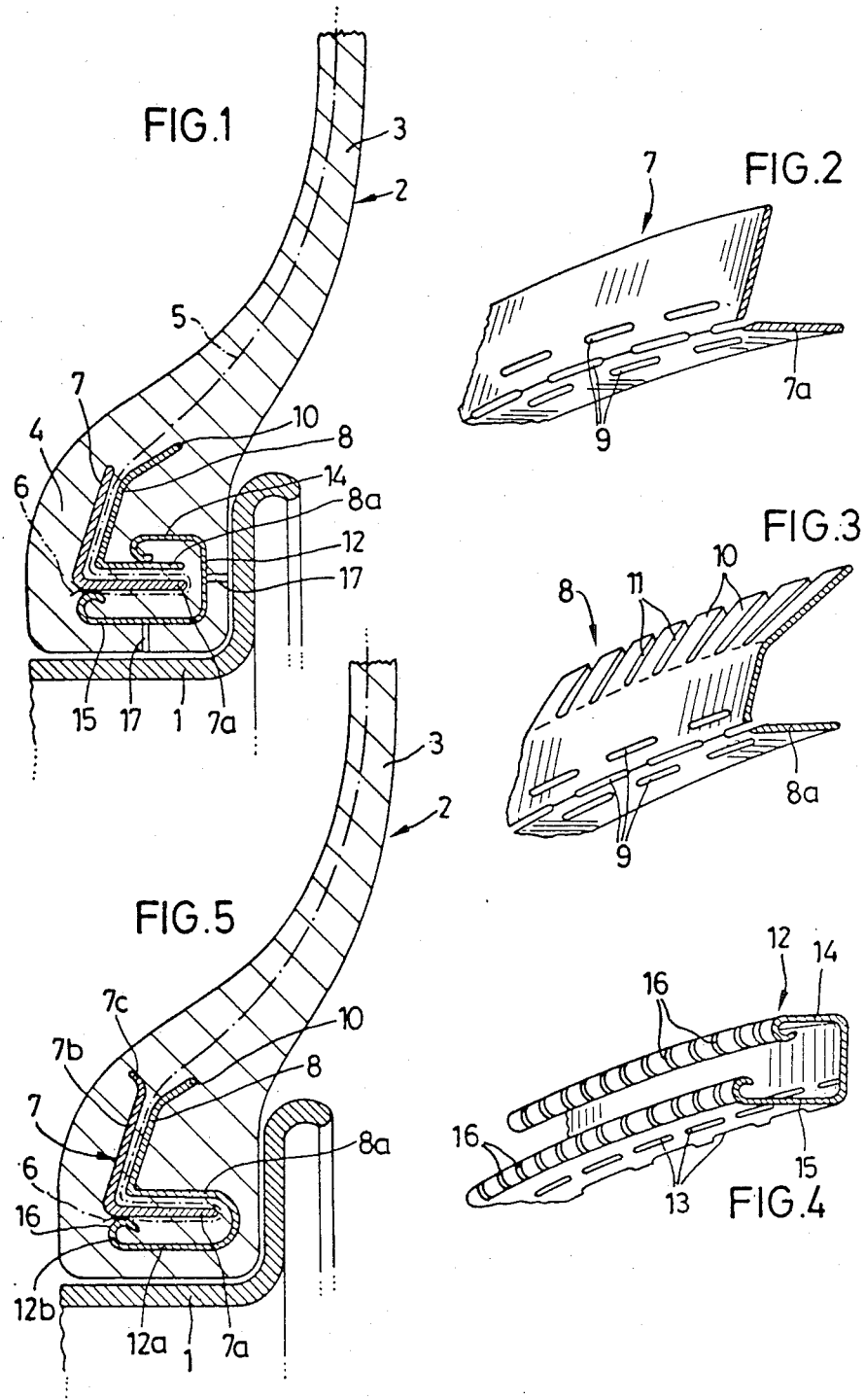

PNEUMATIC TIRE HAVING MULTI-PART ANNULAR BEAD CORE

The invention relates to a pneumatic tire which is designed for vehicles and which comprises a toroidally bowed body, with beads formed on it, a multi-part annular core in each bead and a cord or carcass ply the ends of which are conducted through respective ones of the multi-part cores.

In pneumatic tires for vehicles there is a problem with regard to how the necessary cord plies or textile reinforcements should be connected to the cores which are embedded in the material of the bead of the tire. It is usual to fold the cord ply around the core and to lead the free ends of it back into the region of the side wall of the tire. This results in the drawback that the side walls of the tire are relatively stiff in the region of the bead because they are made thicker, by the presence of the folded-back textile reinforcement, than is necessary for the stability of the tire. This in its turn leads to a reduced elasticity of the tire in the region of its side walls. Moreover the exposed selvages of the bead envelope represent a danger to the durability of the carcass in the region of the side walls of the tire.

Attempts have been made to solve this problem by making the rings or cores embedded in the bead and formed of a number of threads joined together in a divided or multi-part form, passing the cord ply or textile reinforcement between the two parts of the bead ring or core and connecting it to the rings or cores in a material manner (DE-OS No. 2 408474). It is true that in this way it is possible to avoid folding back the cord ply in the region of the bead and thereby to avoid unnecessary thickening of the side walls of the tire, but there is no certainty that the cord ply or reinforcement is connected sufficiently securely and permanently to the rings or cores in the beads. Moreover the uniform distribution of material within the bead ring profile forming the basis of the carcass, which is necessary for perfect roundness, is lacking.

A further problem in the vehicle pneumatic tires known hitherto lies in the fact that the position of the bead rings or cores within the bead region is not capable of being sufficiently accurately controlled and corresponding non-uniformities and in fact unbalanced effects arise, these being particularly undesirable in tires designed for high speeds.

The invention is based on solving the problem of improving the known pneumatic tires for vehicles in such a way that they can have a greater elasticity in the side wall region without the anchorage between the cord plies and the bead rings or cores being adversely affected, whilst at the same time the bead rings or cores should be more true to form and their position in the beads should be more accurately determined than has been possible hitherto and the weight and cost should be capable of reduction without having to lose the flexibility necessary for fitting.

This problem is solved according to the invention in that each bead ring or core is made up of mutually locating mechanically interengaging shaped rings between which a respective end of the cord ply or textile reinforcement lies, so that the cord ply is connected to the bead rings or cores not only in a material manner or by force, but also mechanically. In this way one obtains a rigid and permanent anchorage between the cord ply and the bead rings or cores in which the extent of the cord plies inserted between the two bead rings or cores is uniform at any peripheral point in the carcass of the tire without the cord plies having to be passed around the bead rings and conducted back with their ends in the side walls of the tire. On the contrary the cord plies can terminate in the region of the bead rings or cores without any fear of deficient anchorage between the bead rings and the plies. As the bead rings or cores are made up of mutually co-operating shaped rings and not, as hitherto, of wire loops, they have an improved truth to form and allow themselves to be positioned in the bead region of the tire more accurately than was hitherto possible and they fully maintain their shape and position, even during the heating and pressing operations. Indeed they can be formed more easily than the hitherto usual bead rings or cores without thereby giving rise to problems of lack of strength.

Preferably the two profiled rings are made of substantially L or U shape, i.e. they can be made from profiled strip material so that they can be manufactured at minimum cost. Bead cores or rings of strip material can be positioned particularly accurately in the bead region of the tire.

The upwardly extending limb of at least one of the two shaped rings is bent outwards. This has the advantage that sharp edges are avoided at the point where the cord ply or reinforcement enters the two-part bead ring or core, so that no compression or pinching loads arise and also so that the cord ply or reinforcement cannot be kinked by a sharp edge when the tire is deflated and the vehicle is still driven on towards the next garage. The provision of the bent-back limb avoids any localized pressures on the threads of the carcass. Accordingly the pneumatic tire made in accordance with the invention has correspondingly good run-flat behaviour.

According to a further feature of the invention each profiled ring of the multi-part bead ring or core has slots or elongated holes extending in a peripheral direction, these holes on the one hand ensuring good mechanical keying between the ring and the elastic material of the tire and on the other hand ensuring a certain degree of flexibility of the otherwise stiff rings, in particular in torsion.

These slots or elongated holes could be arranged in a number of parallel rows, the slots in the individual rows being mutually staggered whilst the slots in the two rings which are brought together are aligned in practice in order not only to achieve a mechanical connection between the elastic material of the tire and the profiled rings or cores but also to ensure that an un-slotted portion of one profiled ring does not cancel out the elastic behaviour of the other ring which is slotted at this point.

According to a further feature of the invention each bead ring or core is provided with a clamping ring which engages in a jamming manner over one of the limbs of both parts of the ring. In this way the connection between the two parts of each bead ring or core and the cord ply or reinforcement lying between them is improved in particular during the manufacture of the tire so that the two parts of the bead ring or core and the textile ply or reinforcement between them are connected together firmly and permanently. After manufacture of the tire the elastic material of the tire holds the profiled rings and the cord ply in the position determined by the clamping ring.

By way of example each clamping ring has two resiliently formed limbs which engage the limbs of the profiled rings which are pressed together by the clamping ring and the limbs of the clamping ring are formed for example in such a way that the clamping ring, which is made of strip material, has transversely extending notches in its longitudinal edges. It is of particular advantage to turn in the edge of the clamping ring in the region of these notches, resulting in resilient tongues or clamping fingers.

On the other hand it is also possible to form a resilient clamping ring on one of the limbs of the one profiled ring, i.e. to make it integral with this profiled ring.

As a consequence of its permanently acting resilient engagement against the clamped-together parts there is a centralizing effect on the overall profiled ring or core ring system even during the assembly of the carcass. Also a good connection is achieved between the profiled and clamping rings which are employed and the textile plies and the rubber material present between the profiled rings. This results in an improvement in the flexibility of the tire which is desirable for fitting it, because the profiled rings of each bead ring can move relative to one another.

Two embodiments of the vehicle tire according to the invention are illustrated diagrammatically by way of example in the drawing, in which:

FIG. 1 is a partial section through the region of one of the beads of the tire.

FIG. 2 is a perspective view of the one profiled ring of the bead core or ring of the tire.

FIG. 3 is a partial view of the other profiled ring of the core.

FIG. 4 is a partial view of the clamping ring and

FIG. 5 is a partial section through the region of the bead of the tire in accordance with a second embodiment of the invention.

As shown in FIG. 1 a pneumatic tire 2 is mounted on a rim 1, which is only shown in part, and the tire has relatively thin side walls 3, each joined to a thicker bead 4 engaging the rim 1.

Embedded in the tire is a carcass ply comprising textile ply or cord reinforcement 5, illustrated only diagrammatically of which the ends 6 lie within the beads 4 and are not led back into the region of the side walls of the tire.

As shown in FIG. 1 embedded in each bead 4 is a respective annular core or ring comprising two profiled rings 7 and 8 of substantially L-shaped profile or U-shaped profile, these rings fitting one in the other in adjacent and substantially parallel relationship and indeed if necessary mechanically interlocking. The end 6 of the cord ply 5 is so-to-speak clamped between these shaped rings 7 and 8 so that it cannot pull away from the core of the bead even under the highest tension loadings which arise during use on the road.

As shown in FIGS. 2 and 3 the profiled rings 7 and 8 which are made of strip material have longitudinally extending slots 9 which gives them a certain degree of torsional elasticity and allow the material of the rubber of the tire 2 to pass through the rings 7 and 8 in order to avoid any air bubbles and to provide a mechanical connection between the material of the tire and the profiled rings which have an otherwise smooth surface.

In the embodiment illustrated by way of example the inner ring 8 is provided on its upper or outer end with resilient tongues 10 which are defined by transversely extending notches 11, so that this ring 8 has a certain resilience in the direction towards the side wall of the tire and cannot kink and thereby nip the cord ply 5 when the tire is flat and is used in an emergency. Although it is not illustrated in this way in the drawing, the ring 7 could also be similarly shaped.

The limbs 7a and 8a, extending substantially horizontally, of the shaped rings 7 and 8 are held together by means of a clamping ring 12 which is likewise made of strip material and has longitudinally extending slots 13. The substantially mutually parallel limbs 14 and 15 are folded over inwards and made resilient by the provision of transverse notches 16 so that they hold the limbs 7a and 8a of the rings 7 and 8 and the associated end of the cord ply 5 together like a resilient clamp. According to the compression loading of the finished vulcanized tire 2 in particular during its fitting, the clamping ring 12 can, by virtue of its resilient edges and the surrounding rubber material, move relative to the joined rings 7 and 8 and also form small local radii.

The profiled or shaped rings 7, 8 and 12 necessarily locate one another relatively by virtue of their shape. During the construction of the tire they can in addition be held together in the desired position by pins provided in the tire mold or vulcanising mold, leaving small openings 17 in the finished tire, but these openings do not affect the finished tire.

In the embodiment shown in FIG. 5 the upwardly extending limb 7b of the inner ring 7 is provided with a bent-back edge 7c which extends outwards in relation to this ring, but inwards when looked at in relation to the tire 2, in order to prevent any kinking or trapping of the cord ply 5 by the ring 7.

In addition in this embodiment a hoop-shaped clamping ring 12a is formed on the substantially horizontal limb 8a of the other ring 8, and its inwardly folded free edge 12h bears resiliently against the inwardly extending limb 7a of the ring 7 and in this way secures the end 6 of the cord ply 5 between the rings 7 and 8.

I claim:

1. A pneumatic tire for a vehicle, said tire having a toroidally bowed body extending about an axis, spaced sidewalls extending radially inward to beads disposed about an inner diameter of said tire, said spaced sidewalls including carcass plies extending said beads, each of said beads including a multi-part annular core comprising a plurality of profiled rings, each of said rings comprising a strip material having an L-shape or U-shape cross-section including substantially flat limb members, said core also including mechanically interlocking means to lock said rings together with portions of said limb members on separate rings disposed in adjacent and substantially parallel relationship, said carcass plies having opposed ends extending between said adjacent and substantially parallel portions of said limb members for connection to said cores.

2. A tire according to claim 1, wherein said adjacent and substantially parallel portions of said limb members include axially extending portions transversely disposed with respect to said sidewalls.

3. A tire according to claim 2, wherein said adjacent and substantially parallel portions of said limb members also include radially extending portions aligned with respect to said sidewalls.

4. A tire according to claim 3, wherein said radially extending portions of said limb members include at least one limb member extending to a limb end portions disposed at an inclined angle with respect to said axis of said tire.

5. A tire according to claim 4, wherein at least one of said profiled rings include circumferentially extending slots or elongated holes to enhance the resiliency of the ring.

6. A tire according to claim 5, wherein said slots or holes are arranged in rows and the slots or holes are staggered or offset.

7. A tire according to claim 1, wherein said core includes two profiled rings and said mechanical interlocking means is a clamping ring for interlocking said profiled rings together.

8. A tire to claim 7, wherein said clamping ring includes two resilient clamping limb members for biasing said adjacent and substantially parallel portions of said limbs of said profiled rings together.

9. A tire according to claim 8, wherein said clamping ring has a U-shape, said adjacent and substantially parallel portions of said limb members of said profiled rings extending between said resilient clamping limbs.

10. A tire according to claim 1, wherein said mechanical locking means comprises a clamping ring extending from one of said limb members of said profiled rings.

* * * * *